United States Patent
Weber et al.

(10) Patent No.: US 11,233,414 B2
(45) Date of Patent: Jan. 25, 2022

(54) BATTERY MODULE FOR A MOTOR VEHICLE, AND MOTOR VEHICLE

(71) Applicant: Robert Bosch GmbH, Stuttgart (DE)

(72) Inventors: Jochen Weber, Asperg (DE); Joerg Schneider, Ludwigsburg (DE); Peter Kohn, Stuttgart (DE); Sabine Arnold, Oehningen/Wangen (DE); Thomas Kaiser, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/921,053

(22) Filed: Jul. 6, 2020

(65) Prior Publication Data

US 2021/0006083 A1 Jan. 7, 2021

(30) Foreign Application Priority Data

Jul. 4, 2019 (DE) .......................... 102019209805.3

(51) Int. Cl.
*H02J 7/00* (2006.01)
*B60R 16/033* (2006.01)

(52) U.S. Cl.
CPC .......... *H02J 7/0063* (2013.01); *B60R 16/033* (2013.01)

(58) Field of Classification Search
CPC ............................. H02J 7/0063; B60R 16/033
USPC ................................................ 307/10.1, 10.6
See application file for complete search history.

(56) References Cited

U.S. PATENT DOCUMENTS

| 4,587,939 | A | 5/1986 | Hemminger et al. |
| 6,548,996 | B2* | 4/2003 | Yi .......................... H03K 17/284 323/349 |
| 7,932,628 | B2* | 4/2011 | Deschermeier ........ H03K 17/22 307/10.6 |
| 2010/0039155 | A1* | 2/2010 | Chang .................. H03K 5/1254 327/290 |

FOREIGN PATENT DOCUMENTS

| DE | 10005778 | 8/2001 |
| DE | 10340701 | 3/2005 |
| DE | 102004058516 | 6/2006 |
| DE | 102006046032 | 10/2007 |
| DE | 102014008516 | 12/2015 |
| DE | 102016207932 | 11/2017 |

* cited by examiner

*Primary Examiner* — Michael R. Fin
(74) *Attorney, Agent, or Firm* — Michael Best & Friedrich LLP

(57) ABSTRACT

A battery module (5) for a motor vehicle. The battery module (5) includes a battery unit (2), a negative pole (21), a positive pole (22), a switching unit (60), which is connected electrically in series with the battery unit (2) and has at least one controllable switching element, and a management system (30) for controlling the at least one switching element. A hold circuit (40) is provided, which is connected to the management system (30) and to the switching unit (60) in such a way that a control signal from the management system (30) can be transferred through the hold circuit (40) to the switching unit (60), and is designed such that, in an active state of the hold circuit (40), a control signal from the management system (30) to open the at least one switching element can be transferred to the switching unit (60) with a time delay.

8 Claims, 3 Drawing Sheets

BATTERY MODULE FOR A MOTOR VEHICLE, AND MOTOR VEHICLE

BACKGROUND OF THE INVENTION

The invention relates to a battery module for a motor vehicle, which battery module comprises at least one battery unit, a negative pole, a positive pole, a switching unit, which is connected electrically in series with the at least one battery unit and has at least one controllable switching element, and a management system for controlling the at least one switching element. The invention also relates to a motor vehicle comprising a battery module according to the invention.

Conventional motor vehicles comprise a powertrain, which usually includes an internal combustion engine. In addition, conventional motor vehicles comprise a battery module for supplying electrical power to a starter motor and to additional loads in the motor vehicle, and an alternator for charging the battery module. A battery module of the type in question comprises a battery unit containing at least one battery cell, preferably a plurality of battery cells, which are connected in series, for instance, with the result that the battery module has a nominal voltage of 12 V, 24 V or 48 V, for example. The battery cells are lithium-ion battery cells, for example.

A battery module of the type in question also comprises a switching unit, by means of which the battery unit can be switched in, i.e. connected to an electrical system of the motor vehicle, and switched out, i.e. disconnected from said electrical system. When the battery is switched in, then said nominal voltage supplied by the battery cells lies between a positive pole and a negative pole of the battery module. For this purpose, the switching unit comprises a switching element, for example embodied as an electromechanical relay or a contactor, which can be opened and closed by appropriate control.

A battery module of the type in question also comprises a management system, which is used to monitor the battery unit and to control the switching unit. By means of appropriate control by the management system, the switching element of the switching unit can be opened, thereby switching out the battery unit, and can be closed, thereby switching in the battery unit.

The switching unit and the management system are normally designed such that in order to close the switching element, an appropriate control signal in the form of a control voltage is transferred from the management system to the switching unit. The switching element remains closed as long as the control voltage is present at the switching unit. If the control voltage at the switching unit drops, then the switching element is opened.

In the event of the management system malfunctioning briefly, for instance as a result of a reset of a microcontroller in the management system, the control voltage at the switching unit drops. This has the effect of opening the switching element, thereby switching out the battery unit. The battery unit is hence disconnected from the electrical system until the management system is fully operational again and the control voltage is again present at the switching unit.

SUMMARY OF THE INVENTION

A battery module for a motor vehicle, in particular for a motor vehicle having an internal combustion engine, is proposed. The battery module comprises at least one battery unit, which preferably comprises a plurality of battery cells that can be connected to one another inside the battery unit both in series and in parallel. The battery cells are preferably embodied as lithium-ion battery cells.

The battery module also comprises a negative pole and a positive pole. For installation in a motor vehicle, i.e. for connection to an electrical system of the motor vehicle, the two poles of the battery module are electrically connected to corresponding connections of the motor vehicle. A nominal voltage of 48 V, for example, is present between the poles during operation of the battery module on the electrical system of the motor vehicle.

The battery module additionally comprises a switching unit, which is connected electrically in series with the at least one battery unit. The at least one battery unit can be electrically connected in particular to the two poles, and electrically disconnected from at least one of the poles by means of the switching unit. The switching unit comprises for this purpose at least one controllable switching element.

The battery module also comprises a management system. The management system is used in particular for monitoring the battery cells of the battery unit and for controlling the at least one switching element of the switching unit. In order to control the at least one switching element, an appropriate control signal is transferred from the management system to the switching unit.

According to the invention, a hold circuit is provided, which is connected to the management system and to the switching unit in such a way that a control signal from the management system can be transferred through the hold circuit to the switching unit. Said hold circuit is designed such that, in an active state of the hold circuit, a control signal from the management system to open the at least one switching element can be transferred to the switching unit with a time delay.

According to a preferred embodiment of the invention, the hold circuit is designed such that in a passive state of the hold circuit, a control signal from the management system to open the at least one switching element can be transferred to the switching unit without a delay.

According to an advantageous development of the invention, the hold circuit comprises an activation input. The hold circuit can be brought into the active state by applying an activation signal to said activation input. In addition, the hold circuit can be brought into the passive state by applying a passivation signal to the activation input.

According to an advantageous embodiment of the invention, the hold circuit is designed such that a control signal from the management system to close the at least one switching element can be transferred to the switching unit without a delay.

The hold circuit preferably comprises a control input, which is connected to the management system, and to which can be transferred a control signal from the management system to open and to close the at least one switching element of the switching unit. The hold circuit preferably also comprises a control output, which is connected to the switching unit, and from which a control signal to open and to close the at least one switching element of the switching unit can be transferred to the switching unit. The control input and the control output of said hold circuit are preferably connected to one another by means of a diode.

According to a preferred embodiment of the invention, the switching unit comprises a first switching element, which is embodied as a MOSFET, and which comprises a first switching path and a first body diode, which is connected in parallel with the first switching path. The switching unit also comprises a second switching element, which is likewise embodied as a MOSFET, and which comprises a second switching path and a second body diode, which is connected in parallel with the second switching path. As a result of its internal structure, every MOSFET contains a body diode, which is not an explicit component.

Said switching elements are preferably connected electrically in series between a first connection point and a second connection point of the switching unit in such a way that the body diodes of the switching elements are connected electrically in anti-series. In this case, the first connection point is connected, for example, to the at least one battery unit, and the second connection point is connected, for example, to the positive pole.

According to an advantageous embodiment of the invention, the two switching elements of the switching unit can be controlled independently of one another.

The two switching elements of the switching unit are preferably connected such that the first body diode allows a current flow through the switching unit for charging the at least one battery unit, and such that the second body diode allows a current flow through the switching unit for discharging the at least one battery unit.

According to a preferred embodiment of the invention, the management system, the switching unit and the hold circuit are interconnected such that in the active state of the hold circuit, a control signal from the management system to open the first switching element can be transferred to the switching unit with a time delay, and such that a control signal from the management system to open the second switching element can be transferred to the switching unit without a delay.

A motor vehicle is also proposed. Said motor vehicle according to the invention comprises at least one battery module according to the invention.

Advantages of the Invention

In a battery module according to the invention, a control signal from the management system in the form of a control voltage can be maintained for the time length of a time delay. In the event of a brief drop in the control voltage at the management system, the control voltage at the switching unit is nonetheless maintained for the time length of the time delay. If the time length of the time delay is greater than or equal to the time length that a microcontroller of the management system requires for the reset, then the control voltage at the switching unit is maintained in particular during a reset of a microcontroller. Hence the switching element of the switching unit remains closed during a reset of a microcontroller, and the battery unit remains connected in. Thus the electrical system of the motor vehicle can continue to be supplied with a voltage via the poles of the battery module. In particular, safety-relevant components of the motor vehicle that are connected to the electrical system thus remain continuously available and do not malfunction briefly during a reset of a microcontroller.

When the hold circuit is being operated in a passive state in which the control voltage from the management system is transferred to the switching unit without a delay, a self-test of the battery module is also possible. In particular it is possible to test the functioning of the switching unit and of the switching element in a self-test of a safety-relevant disconnection path of the battery module.

If the switching unit comprises two switching elements embodied as MOSFETs and containing body diodes connected in anti-series, then a current flow for charging and for discharging the battery unit can be controlled separately. In particular, this allows a current flow for discharging the battery unit during a reset of a microcontroller, thereby ensuring a continued supply to the electrical system. It can also prevent during a reset of the controller a current flow for charging the battery unit, thereby ensuring the intrinsic safety of the battery module.

BRIEF DESCRIPTION OF THE DRAWINGS

Embodiments of the invention are explained in greater detail with reference to the following description and the drawings,
in which.

In the following description of the embodiments of the invention, identical or similar items are denoted by the same reference signs, and a description of these items is not repeated in some cases. The figures provide only a schematic representation of the subject matter of the invention.

DETAILED DESCRIPTION

Figure 1:
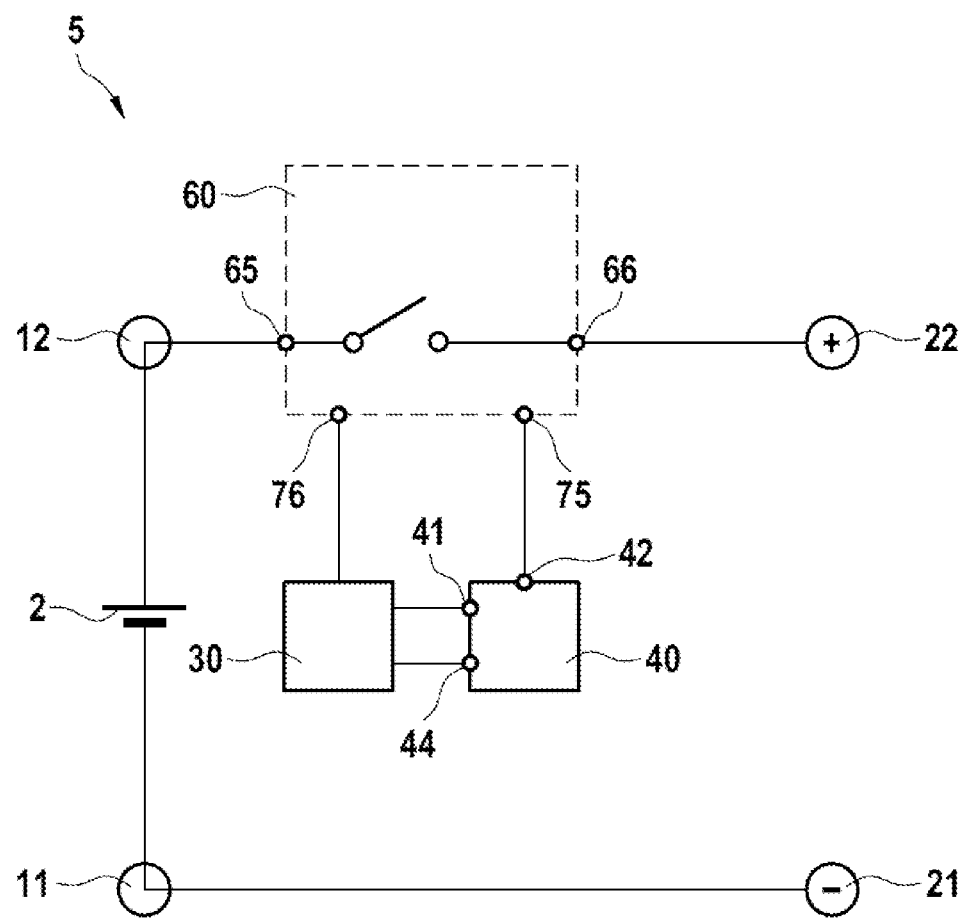
FIG. 1 shows a schematic diagram of a battery module.

FIG. 1 shows a schematic diagram of a battery module 5 for a motor vehicle. The battery module 5 comprises a battery unit 2 having a plurality of battery cells that are connected to one another in series. The battery cells are embodied as lithium-ion battery cells in the present case. The battery unit 2 is arranged electrically between a positive terminal 12 and a negative terminal 11.

A voltage supplied by the battery cells of the battery unit 2, for example a voltage of 48 V, is therefore present between the positive terminal 12 and the negative terminal 11. The battery module 5 also comprises a negative pole 21 and a positive pole 22. The negative terminal 11 is electrically connected to the negative pole 21.

The battery module 5 is connected to an electrical system (not shown here) of a motor vehicle. When a charging current is flowing from the positive pole 22 through the battery unit 2 to the negative pole 21, then the battery cells of the battery unit 2 are being charged. When a discharge current is flowing from the negative pole 21 through the battery unit 2 to the positive pole 22, then the battery cells of the battery unit 2 are being discharged.

The battery module 5 comprises a switching unit 60. The switching unit 60 comprises a first connection point 65 and a second connection point 66. The first connection point 65 of the switching unit 60 is electrically connected to the positive terminal 12. The second connection point 66 of the switching unit 60 is electrically connected to the positive pole 22. The switching unit 60 is thus connected electrically in series between the positive pole 22 and the positive terminal 12. The switching unit 60 is thus connected electrically in series with the battery unit 2 between the poles 21, 22.

The battery module 5 also comprises a management system 30 for controlling and monitoring the battery cells of the battery unit 2. The management system 30 is also used to control the switching unit 60. In particular, the management system 30 is used to control at least one switching element 61, 62 (not shown here) of the switching unit 60.

The battery module 5 additionally comprises a hold circuit 40. The hold circuit 40 comprises an activation input 44. The hold circuit 40 can be brought into an active state by applying an activation signal to the activation input 44. The hold circuit 40 can be brought into a passive state by applying a passivation signal to the activation input 44. In the present case, the activation input 44 is connected to the management system 30.

The hold circuit 40 comprises a control input 41, which is connected to the management system 30, and a control output 42, which is connected to a first control input 75 of the switching unit 60. A control signal from the management system 30 to open and to close a first switching element 61 of the switching unit 60 is transferred from the management system 30 to the control input 41 of the hold circuit 40.

If the hold circuit 40 is in the active state, then the control signal to open the first switching element 61 of the switching unit 60 is transferred with a time delay from the control output 42 of the hold circuit 40 to the first control input 75 of the switching unit 60.

If the hold circuit 40 is in the passive state, then the control signal to open the first switching element 61 of the switching unit 60 is transferred without a delay from the control output 42 of the hold circuit 40 to the first control input 75 of the switching unit 60.

A control signal from the management system 30 to close the first switching element 61 of the switching unit 60 is always, i.e. irrespective of the state in which the hold circuit 40 finds itself, transferred without a delay from the control output 42 of the hold circuit 40 to the first control input 75 of the switching unit 60.

A second control input 76 of the switching unit 60 is connected to the management system 30. A control signal from the management system 30 to open and to close a second switching element 62 of the switching unit 60 is transferred from the management system 30 directly to the second control input 76 of the switching unit 60. A control signal from the management system 30 to open and to close the second switching element 62 is thus transferred without a delay to the switching unit 60, independently of the hold circuit 40.

Figure 2:
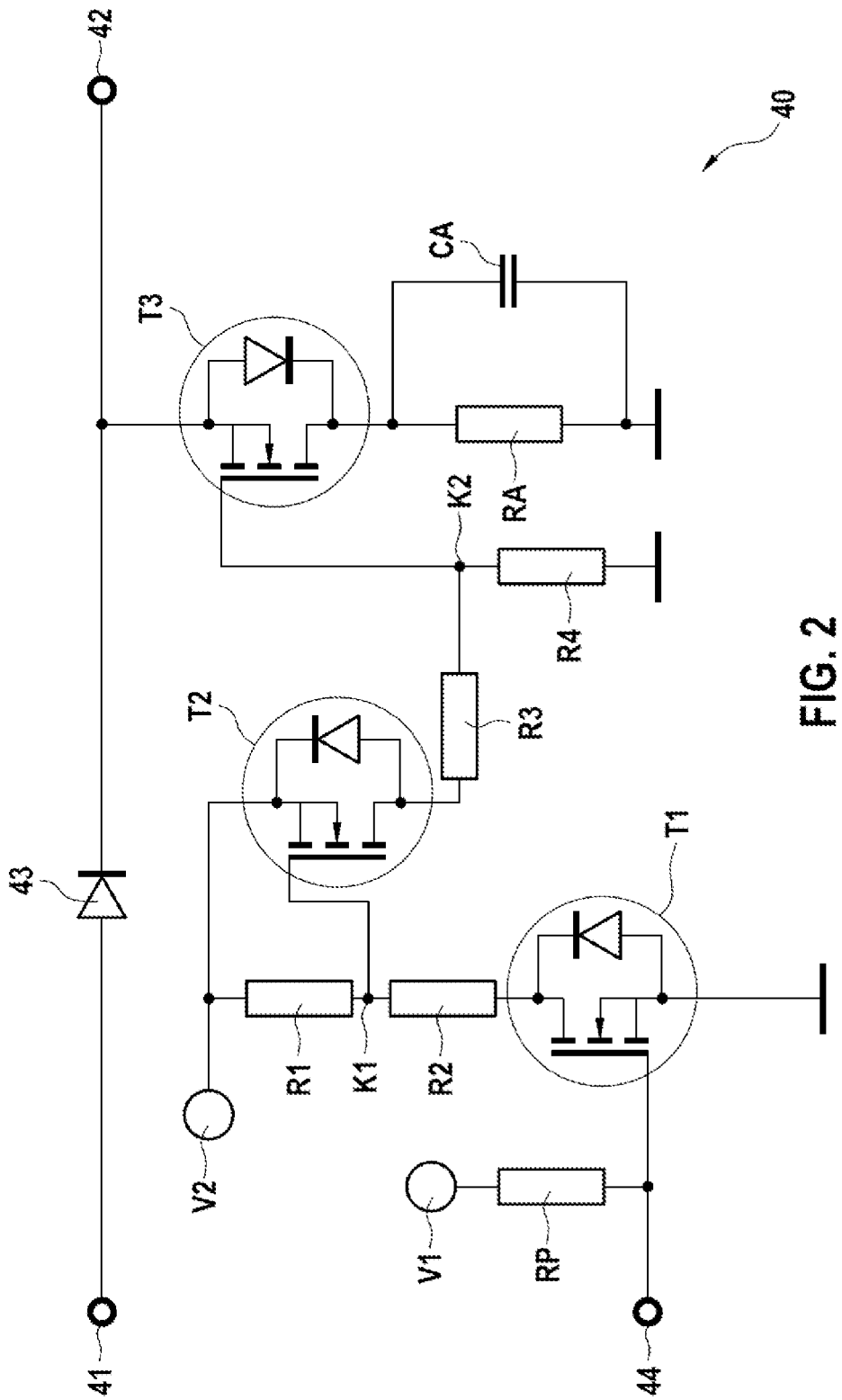
FIG. 2 shows a schematic diagram of a hold circuit.

FIG. 2 shows a schematic diagram of a hold circuit 40. The hold circuit 40, as already mentioned, comprises a control input 41, a control output 42 and an activation input 44. The control input 41 and the control output 42 of the hold circuit 40 are connected together by means of a diode 43.

The hold circuit 40 comprises a first semiconductor switch T1, a second semiconductor switch T2 and a third semiconductor switch T3. The semiconductor switches T1, T2, T3 are each embodied as a MOSFET. The semiconductor switches T1, T3 are embodied here as n-channel MOSFETs; the semiconductor switch T2 is embodied here as a p-channel MOSFET.

A GATE terminal of the first semiconductor switch T1 is connected to the activation input 44. The GATE terminal of the first semiconductor switch T1 is also connected via a pull-up resistor RP to a first voltage source V1, which supplies a voltage of 5 V, for example.

A SOURCE terminal of the first semiconductor switch T1 is connected to ground. A DRAIN terminal of the first semiconductor switch T1 is connected via a series circuit composed of a first resistor R1 and a second resistor R2 to a second voltage source V2, which supplies a voltage of 12 V, for example.

A GATE terminal of the second semiconductor switch T2 is connected to a first node K1, which is located between the first resistor R1 and the second resistor R2.

A SOURCE terminal of the second semiconductor switch T2 is connected to the second voltage source V2. A DRAIN terminal of the second semiconductor switch T2 is connected to ground via a series circuit composed of a third resistor R3 and a fourth resistor R4.

A GATE terminal of the third semiconductor switch T3 is connected to a second node K2, which is located between the third resistor R3 and the fourth resistor R4.

A SOURCE terminal of the third semiconductor switch T3 is connected to the control output 42 and to the diode 43. A DRAIN terminal of the third semiconductor switch T3 is connected to ground via a parallel circuit composed of an output resistor RA and an output capacitor CA.

When the activation input 44 is connected to ground, then the hold circuit 40 is inactive and a signal is not held at the control output 42.

If a voltage of 5 V, for example, is present at the activation input 44, then the hold circuit 40 is active and a signal is held at the control output 42. The time delay here depends on values of the output capacitor CA and of the output resistor RA.

If the activation input 44 is driven in the high-impedance state, which is what happens during a reset of a microcontroller in the management system 30, then the voltage at the GATE terminal of the first semiconductor switch T1 is pulled to a voltage of 5 V, for example, via the pull-up resistor RP. The hold circuit 40 is hence active, and a signal is held at the control output 42.

Figure 3:
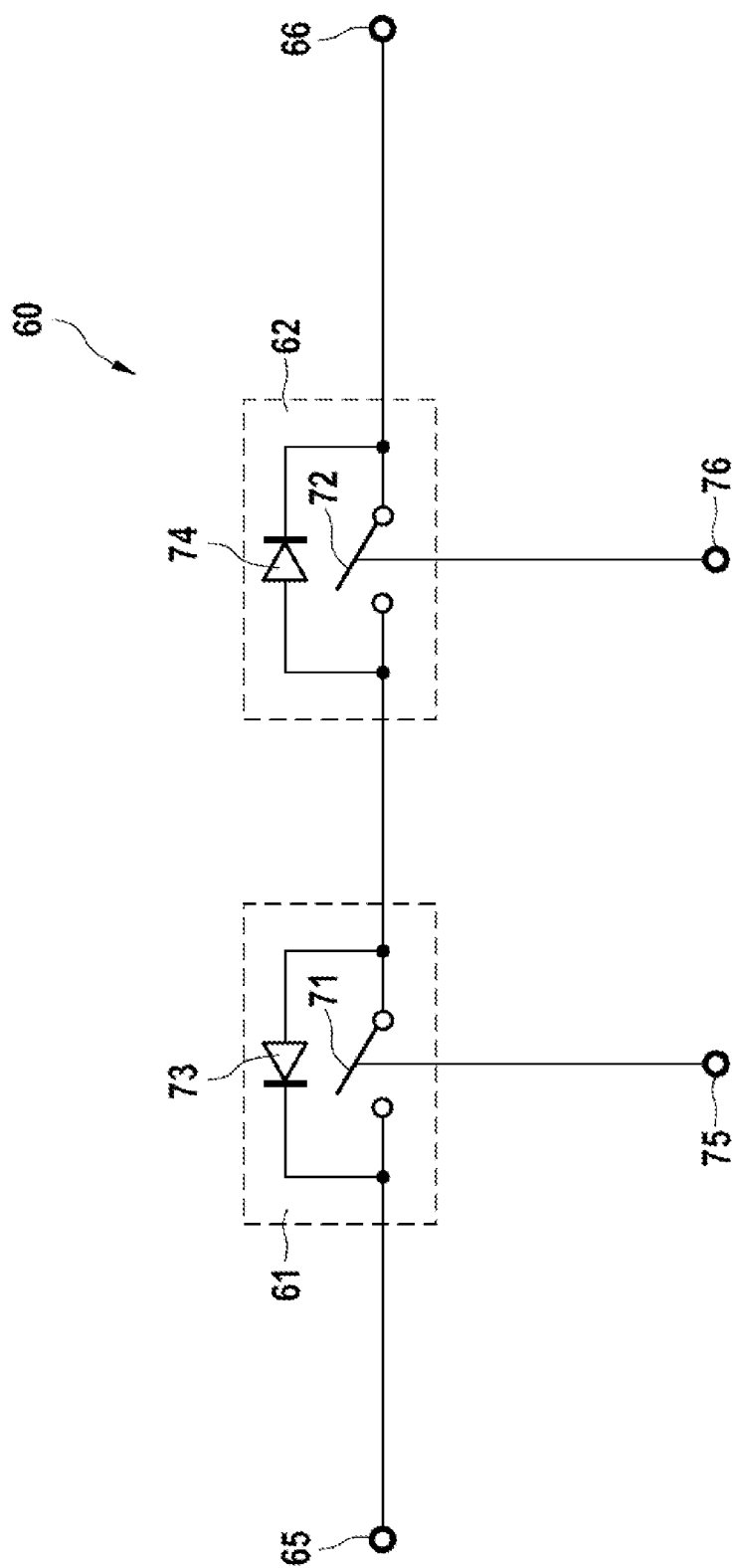
FIG. 3 shows a schematic diagram of a switching unit.

FIG. 3 shows a schematic diagram of a switching unit 60. The switching unit 60 comprises, inter alia, a first switching element 61 and a second switching element 62. The first switching element 61 and the second switching element 62 are in this case connected electrically in series between a first connection point 65 and a second connection point 66 of the switching unit 60.

The first switching element 61 is embodied as a MOSFET. The first switching element 61 comprises a controllable first switching path 71 and a first body diode 73. The first body diode 73 is connected electrically in parallel with the controllable first switching path 71. The first body diode 73 conducts a current flow in one direction, and blocks a current flow in the opposite direction.

The second switching element 62 is embodied as a MOSFET. The second switching element 62 comprises a controllable second switching path 72 and a second body diode 74. The second body diode 74 is connected electrically in parallel with the controllable second switching path 72. The second body diode 74 conducts a current flow in one direction, and blocks a current flow in the opposite direction.

The two switching elements 61, 62 are arranged within the switching unit 60 such that the two body diodes 73, 74 are connected electrically in anti-series. According to the present arrangement shown in FIG. 1 of the switching unit 60 in the battery module 5, a current flow through the switching unit 60 to charge the battery unit 2 is possible through the first body diode 73. A current flow through the switching unit 60 to discharge the battery unit 2 is possible through the second body diode 74.

The first control input 75 of the switching unit 60 is connected to a GATE terminal (not shown here) of the first switching element 61, which is embodied as a MOSFET. The first switching path 71 can be controlled by applying an appropriate signal to the first control input 75.

The second control input 76 of the switching unit 60 is connected to a GATE terminal (not shown here) of the second switching element 62, which is embodied as a MOSFET. The second switching path 72 can be controlled by applying an appropriate signal to the second control input 76.

The two switching elements 61, 62 can thus be controlled independently of one another by applying appropriate signals to the to control inputs 75, 76 of the switching unit 60.

The invention is not limited to the exemplary embodiments described here nor to the aspects highlighted therein. Indeed within the area defined by the claims, numerous variations are possible that lie within the scope of persons skilled in the art.

The invention claimed is:

1. A battery module (5) for a motor vehicle, the battery module comprising:
    at least one battery unit (2),
    a negative pole (21), a positive pole (22),
    a switching unit (60), which is connected electrically in series with the at least one battery unit (2) and has at least one controllable switching element (61, 62), and
    a management system (30) for controlling the at least one switching element (61, 62),
    a hold circuit (40) connected to the management system (30) and to the switching unit (60) so that a control signal from the management system (30) can be transferred through the hold circuit (40) to the switching unit (60), the hold circuit including an activation input (44),
    the hold circuit (4) configured so that, in an active state of the hold circuit (40), a first control signal from the management system (30) to open the at least one switching element (61, 62) is transferred to the switching unit (60) with a time delay and so that, in a passive state of the hold circuit (40), a second control signal from the management system (30) to open the at least one switching element (61, 62) is transferred to the switching unit (60) without a delay,
    wherein the hold circuit (40) is brought into the active state by applying an activation signal to the activation input (44) and is brought into a passive state by applying a passivation signal to the activation input (44).

2. The battery module (5) according to claim 1, wherein the hold circuit (40) is configured so that a control signal from the management system (30) to close the at least one switching element (61, 62) is transferred to the switching unit (60) without a delay.

3. The battery module (5) according to claim 1, wherein the hold circuit (40) comprises
    a control input (41), which is connected to the management system (30), and to which is transferred a control signal from the management system (30), and
    a control output (42), which is connected to the switching unit (60), and from which a control signal is transferred to the switching unit (60),
    wherein the control input (41) and the control output (42) are connected to one another by means of a diode (43).

4. The battery module (5) according to claim 1, wherein the switching unit (60) comprises
    a first switching element (61), which is embodied as a MOSFET, and which comprises a first switching path (71) and a first body diode (73), which is connected in parallel with the first switching path (71), and
    a second switching element (62), which is likewise embodied as a MOSFET, and which comprises a second switching path (72) and a second body diode (74), which is connected in parallel with the second switching path (72), wherein
    the switching elements (61, 62) are connected electrically in series between a first connection point (65) and a second connection point (66) so that
    the body diodes (73, 74) of the switching elements (61, 62) are connected electrically in anti-series.

5. The battery module (5) according to claim 4, wherein the two switching elements (61, 62) are configured to be controlled independently of one another.

6. The battery module (5) according to either claim 4, wherein
    the switching elements (61, 62) are connected so that the first body diode (73) allows a current flow through the switching unit (60) for charging the at least one battery unit (2), and so that
    the second body diode (74) allows a current flow through the switching unit (60) for discharging the at least one battery unit (2).

7. The battery module (5) according to claim 4, wherein the management system (30), the switching unit (60) and the hold circuit (30) are interconnected so that
    in the active state of the hold circuit (40), a control signal from the management system (30) to open the first switching element (61) can be transferred to the switching unit (60) with a time delay, and
    a control signal from the management system (30) to open the second switching element (62) can be transferred to the switching unit (60) without a delay.

8. A motor vehicle comprising at least one battery module (5) according to claim 1.

\* \* \* \* \*